Jan. 1, 1935.  L. C. SHIPPY ET AL  1,986,373
ARMATURE WINDING APPARATUS
Filed June 20, 1931   7 Sheets-Sheet 1

Inventors
Leo C. Shippy
and Lewis G. Malone
By Spencer Hardman and Fike
their Attorneys.

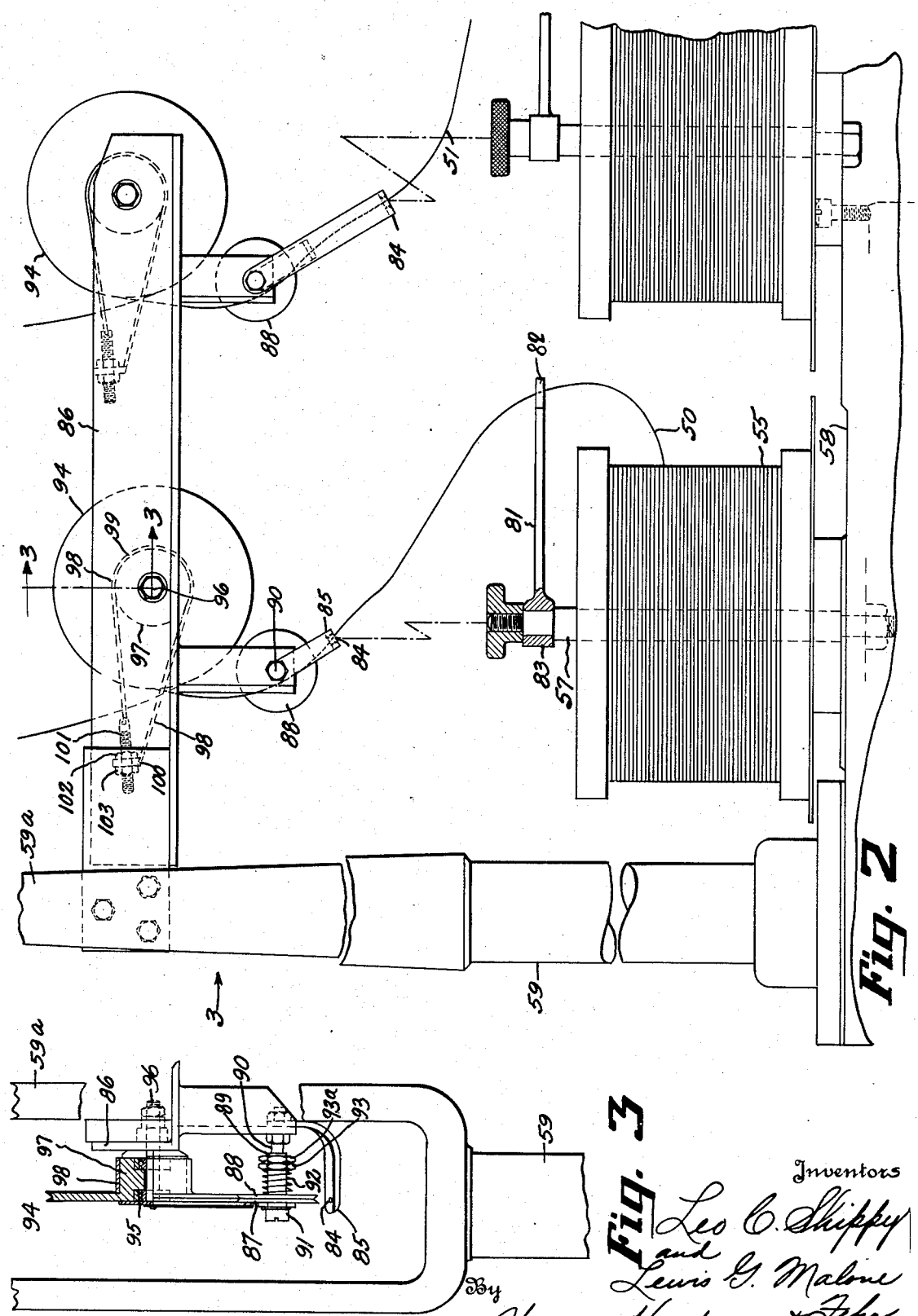

Jan. 1, 1935.  L. C. SHIPPY ET AL  1,986,373
ARMATURE WINDING APPARATUS
Filed June 20, 1931   7 Sheets-Sheet 3

Inventors
Leo C. Shippy
and Lewis G. Malone
By Spencer Hardman & Fehr
their Attorneys.

Jan. 1, 1935.   L. C. SHIPPY ET AL   1,986,373
ARMATURE WINDING APPARATUS
Filed June 20, 1931   7 Sheets-Sheet 5

Inventors
Leo C. Shippy
and
Lewis G. Malone
by Spencer Hardman
and Fehr
their Attorneys.

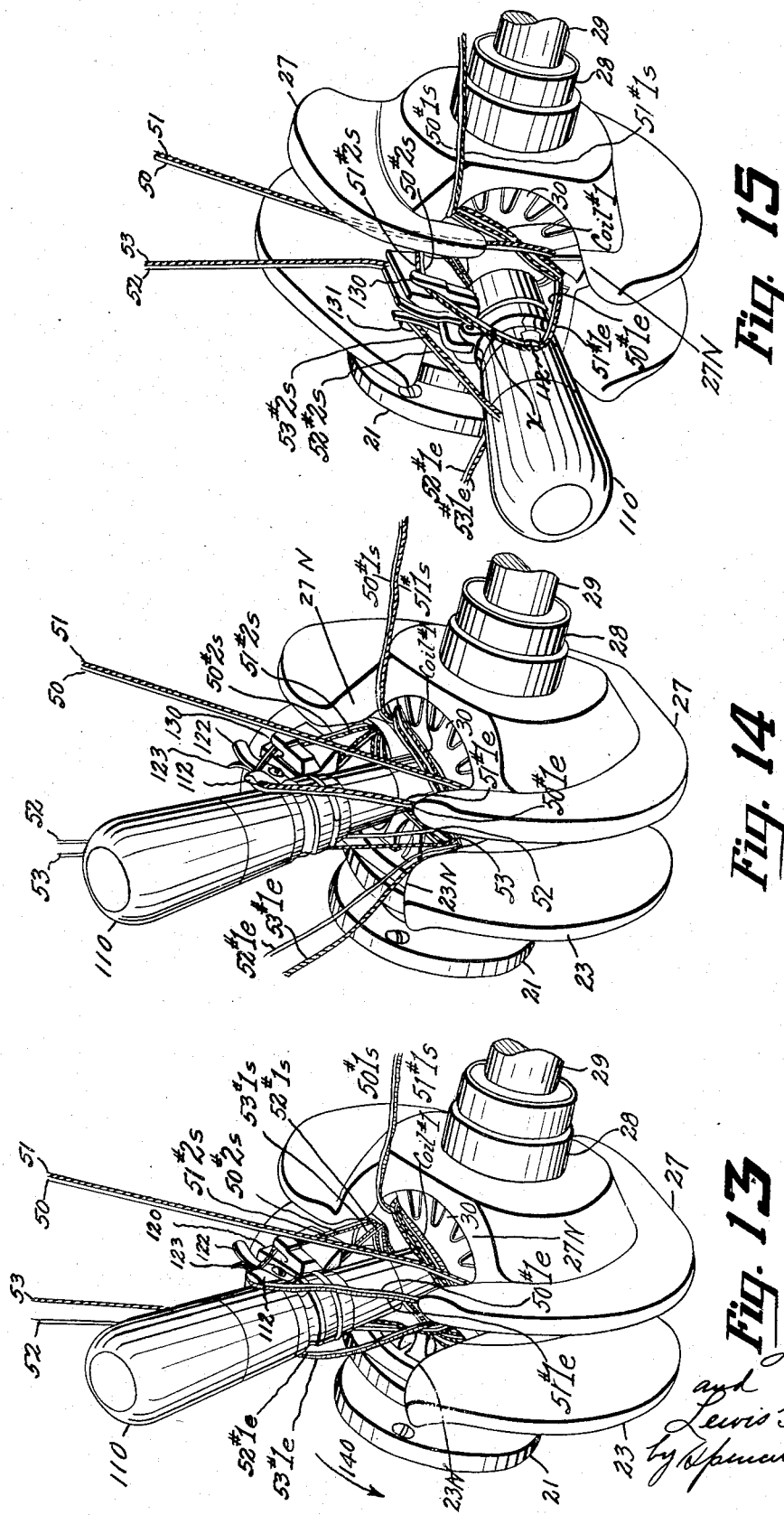

Jan. 1, 1935. L. C. SHIPPY ET AL 1,986,373
ARMATURE WINDING APPARATUS
Filed June 20, 1931   7 Sheets-Sheet 7

INVENTORS
Leo C. Shippy and
Lewis G. Malone
BY
Spencer Hardman & Fehr
their ATTORNEYS Patented Jan. 1, 1935

1,986,373

UNITED STATES PATENT OFFICE 1,986,373

ARMATURE WINDING APPARATUS

Leo C. Shippy and Lewis G. Malone, Anderson, Ind., assignors, by mesne assignments, to General Motors Corporation, Detroit, Mich., a corporation of Delaware Application June 20, 1931, Serial No. 545,824

9 Claims. (Cl. 242—13)

This invention relates to apparatus for winding armatures for dynamo electric machines and includes among its objects the provision of improving means for winding a plurality of sets of armature coils simultaneously into a plurality of pairs of spaced slots of the armature core.

More particularly it is the object of the present invention to provide means for forming a loop in the wires joining the end leads of each of the preceding coils with the starting leads of each of the succeeding coils respectively, these loops being severed to provide leads for joining the armature coils with the proper commutator segments.

A further object is to provide means for holding out of the region of winding leads of previously wound coils which would otherwise interfere with winding.

These aims of the present invention are accomplished by providing a tool or handle which is generally tubular in construction so that it is adapted to be mounted upon one of the projecting ends of the shaft of the armature to be wound. This tool is provided with oppositely arranged hooks about which the wires are passed before proceeding to wind succeeding coils.

A further object is to provide means for winding in such a manner that the start lead of the coil will be brought out from the commutator side of the armature core as far as possible away from the armature shaft in order to avoid abrupt bending of the start leads when attached to the commutator. This object of the invention is accomplished by providing a tool referred to in the preceding paragraph with suitably arranged blocks having wire receiving recesses each recess temporarily receiving the start leads of the windings in order to hold the start leads away from the armature shaft as far as possible so that the start leads will lie as near as possible to the outer portion of the core slots and will be buried underneath subsequent turns of the winding.

Further objects and advantages of the present invention will be apparent from the following description, reference being had to the accompanying drawings, wherein a preferred embodiment of one form of the present invention is clearly shown.

In the drawings:

Fig. 2 is a fragmentary side view partly in section showing a part of the wire unreeling and wire tensioning device.

Fig. 3 is a view looking in the direction of the arrow 3 of Fig. 2 and is partly in section, the section being taken on the line 3—3 of Fig. 2.

Figs. 10 to 15 inclusive are perspective views showing the winding heads and armature and the armature lead loops forming a tool embodying the present invention. These figures show various steps in the operation of winding an armature in accordance with the present invention.

Figs. 16 to 21 are diagrams which supplement Figs. 10 to 15 and which show steps in the present method of winding.

Figure 1:
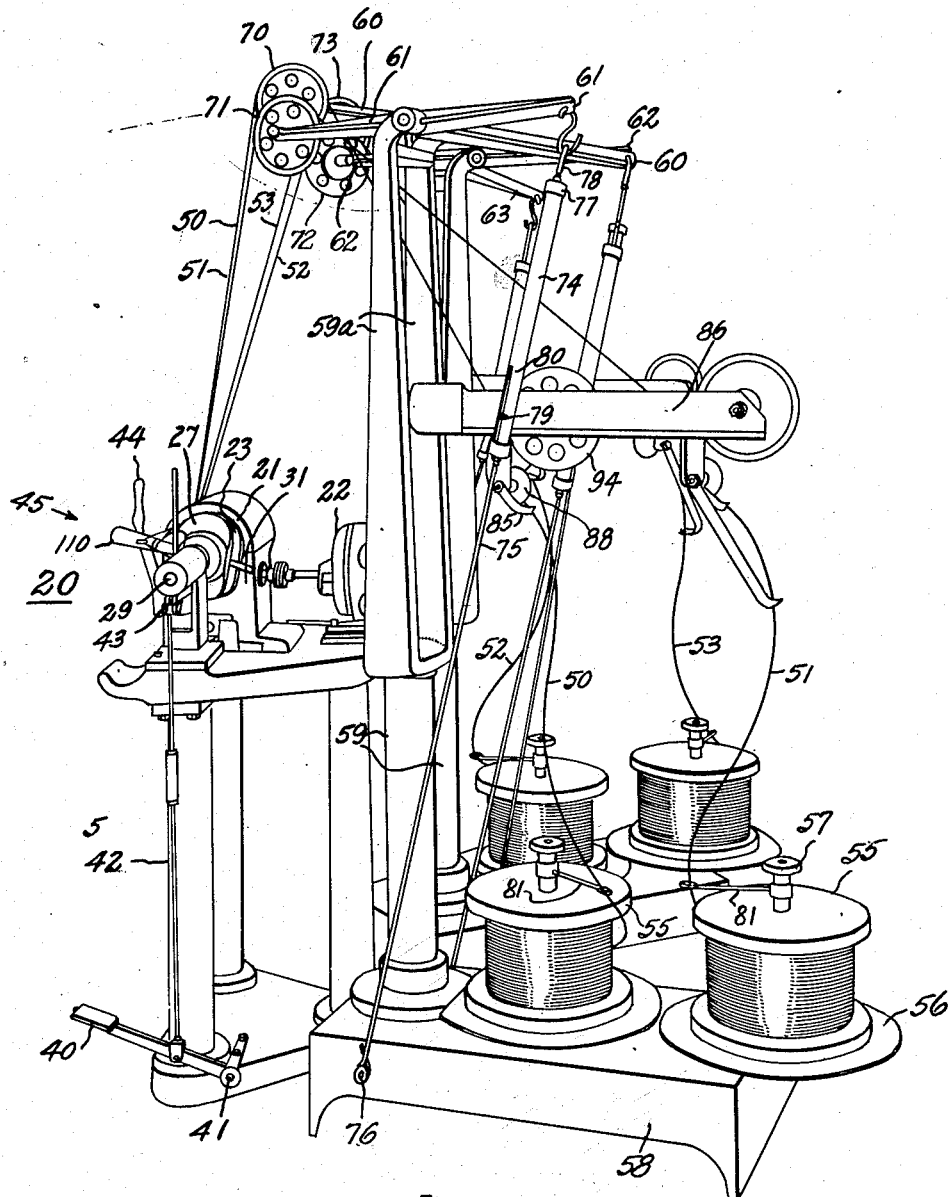
Fig. 1 is a perspective view of winding apparatus including the present invention.
Figure 5:
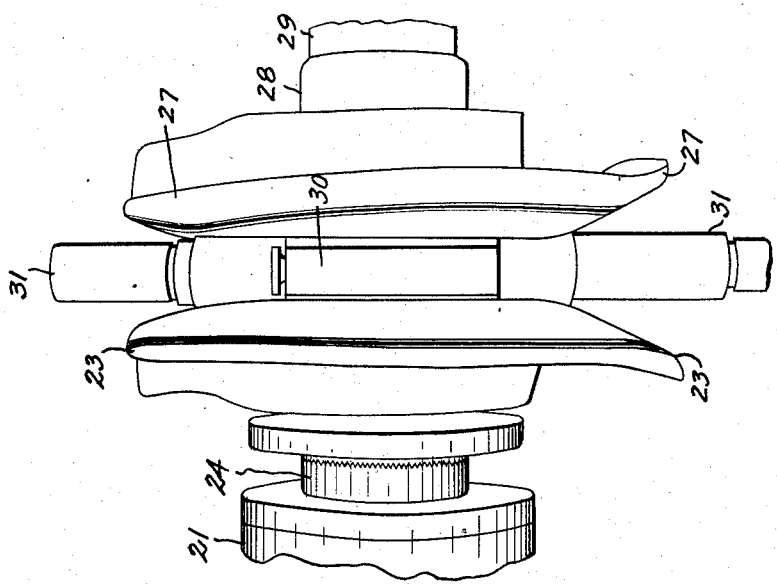
Fig. 5 is a plan view thereof looking in the direction of arrow 5 of Fig. 4.
Figure 4:
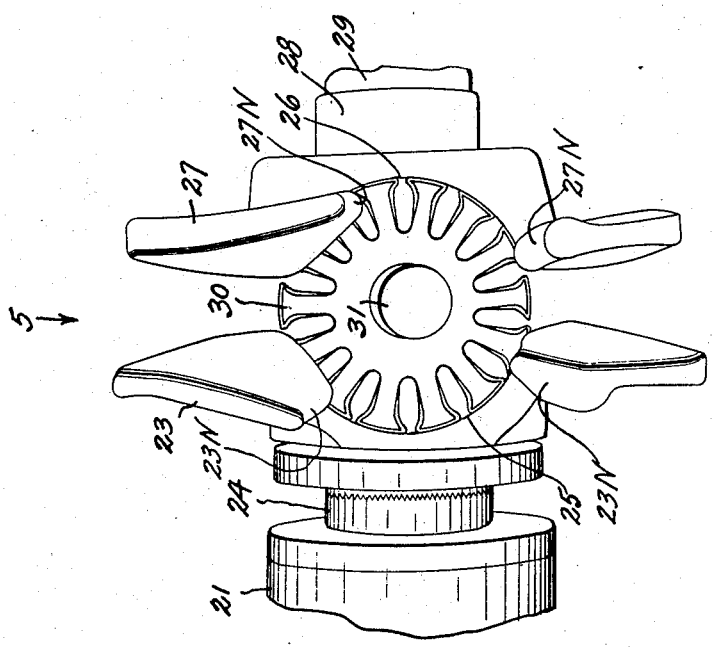
Fig. 4 is a fragmentary side elevation of the winding heads between which the armature is wound.

Referring to Fig. 1 the winding machine designated in its entirety by the numeral 20 is one which is constructed in accordance with the patent to Carter and Miltner #1,609,929 patented December 7, 1926. As the particular construction of the winding machine does not constitute a part of the present invention it is sufficient to state that the machine comprises the mechanism within a housing 21 driven by an electric motor 22 and driving a winding head 23 mounted upon a driving shaft 24 as shown more clearly in Fig. 4. The winding head 23 provides a cylindrical recess 25 for receiving an armature core 30 mounted upon an armature shaft 31. As shown in Figs. 4 and 5 the recess 25 of head 23 receives a left hand portion of the core 30. A right hand portion of the core 30 is received by a recess 26 provided by a driven winding head 27 having a bearing 28 mounted on a stationary shaft 29 which is spring urged axially toward the shaft 24 so that the armature 30 can be clamped between the heads 23 and 27 by spring pressure. To remove the core 30 or to permit indexing the core into a new position the operator presses a pedal 40 pivoted at 41 and connected by a link 42 with a lever 43 which operates to retract the rod or shaft 29 from the head 23 as described in detail in the Carter and Miltner patent referred to. The winding head is set into operation by manipulating a lever 44 and stops automatically when a certain number of turns of wire have been wound upon the core.

In the disclosed embodiment of the present invention the machine provides for winding two sets of coils simultaneously into two pairs of spaced armatured core slots. As the operator views the machine from the left hand side of the machine as shown in Fig. 1, or in the direction of the arrow 45 in Fig. 1 or Fig. 10 the wires which are wound into the right portion of the core are designated by numerals 50 and 51 indicating respectively wires having white insulation covering and colored insulation covering. The wires wound upon the left hand portion of the core as viewed looking in the direction of the arrow 45 and toward Fig. 4 are designated by numerals 52 and 53 respectively indicating respectively wires having white insulation covering and colored insulation covering. Each of these wires is unwound from a reel 55 mounted upon a platform 56 and held in proper position by rod 57 passing through the center of the core and attached to a base 58.

The base 58 supports two pedestals 59 which have bifurcated arms 59a. The pedestal 59 nearest the observer of Fig. 1 pivotally supports the levers 60 and 61 and the pedestal 59 furtherest from the observer supports arms 62 and 63. The arms 60 to 63 inclusive support wire guiding pulleys 70 to 73 respectively which receive the wires 50 to 53 respectively. These levers 60 to 63 are urged in a clockwise direction as viewed in Fig. 1 by spring (not shown) but inclosed within a tubular housing 74 attached at its lower end by a rod 75 fixed at 76 to its base 58, the spring bearing at its upper end against the closed end cover 77 of the housing 74 and its lower end against a disc (not shown) attached to the lower end of a rod or link 78 which passes through an opening in the cover 77 and through the spring and carries near its lower end a pointer 79 which cooperates with a graduated scale 80 indicating the amount of compression of the spring within the housing 74 and indicating the tension being placed upon the wire.

Referring to Figs. 2 and 3 the tension devices will be described. The wire such as a wire 50 is unreeled from the reel 55 by an unreeling arm 81 having an eye 82 through which the wire 50 passes. The hub 83 of the arm 81 is journalled upon the rod 57. The wire passes through an eye 84 in a bracket 85 attached to a horizontal bar 86 supported by one of the arms 59a of the pedestal 59. The wire passes between tension discs 87 and 88. The disc 87 is fixed to a sleeve 89 rotatable on a stud 90 attached to bar 86 and having a head 91 to retain the sleeve 89. The disc 88 is loose upon the sleeve 89 and is urged toward the disc 87 by spring 92 which is located between disc 88 and a nut 93 threaded upon a right hand end of the sleeve 89 and held in an adjusted position by a lock nut 93a. The position of the nuts 93 and 93a can be varied to suit the desired tension of the spring 92 to produce the desired pressure of the discs 87 and 88 upon the wire 50. After the wire 50 passes between the tension discs 87 and 88 it passes around a grooved wheel 94 rotatable upon the bearings 95 carried by a stub shaft 96 also fixed to the horizontal support 86. The hub 97 of the wheel 94 provides a brake drum which cooperates with a brake band 98 lined with friction material 99 lying against the drum 97. The band 98 has one end attached to a fixed part 100 and the other end attached to an adjusting screw 101 loosely passing through the fixed part 100 and secured in an adjusted position by nuts 102 and 103. By adjusting the position of the nuts 102 and 103 along the screws 101 the endwise position of the screw 100 can be varied in order to change the tension in the band 98 and thereby vary the braking friction produced by the band 99 upon the drum 97.

Figure 8:
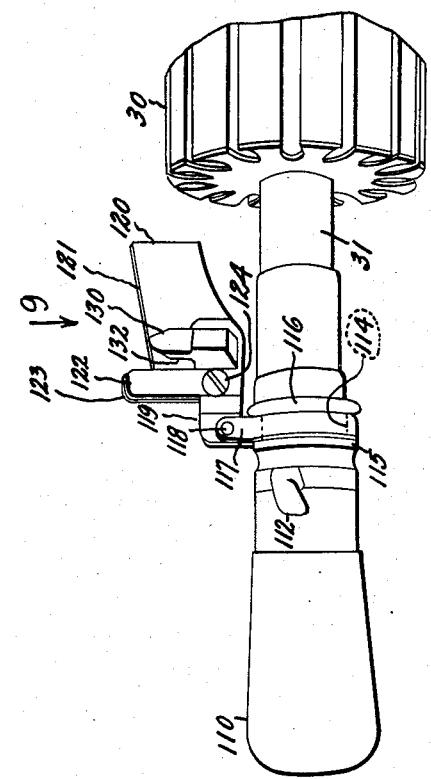
Fig. 8 is a perspective side view looking in the direction of arrow 8 of Fig. 7.
Figure 9:
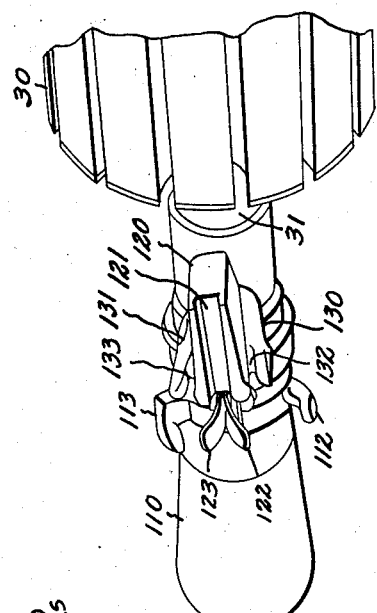
Fig. 9 is a perspective plan view looking in the direction of arrow 9 of Fig. 8.
Figure 7:
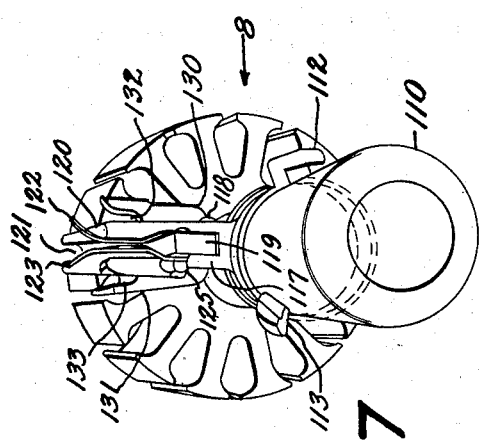
Fig. 7 is a perspective end view of an unwound armature core with a tool embodying the present invention mounted upon the armature shaft.

The tool for facilitating the winding of the armature core in accordance with the present invention will now be described with reference to Figs. 7, 8 and 9. This tool comprises a hollow handle portion 110 adapted to be mounted upon the commutator receiving portion of the armature shaft 31. The handle 110 carries oppositely arranged hooks 112 and 113. The hooks 112 and 113 provide means for forming loops of wires between preceding and succeeding loops, these loops being cut to provide armature coil leads. The handle 110 provides a groove 114 between shoulders 115 and 116. This groove swivelly supports a clamping collar 117 having a pivot 118 pivotally supporting a bar 119 having a lug 120 extending toward the core 30 and providing a groove or trough 121 adapted to be located vertically above and parallel to the shaft 31. The groove 121 receives leads extending from previously wound coils; and a pair of resilient clips 122 and 123 secured to the lug 120 by screws 124 and a nut 125 yieldingly retains these leads in the groove 121 so that they will not interfere with the winding operation. The lug 120 provides blocks 130 and 131 provided with notches 132 and 133 respectively and adapted to receive the start leads of the sets of armature coils wound respectively upon the right and left hand portions of the armature core viewed in Fig. 4.

Figure 12:
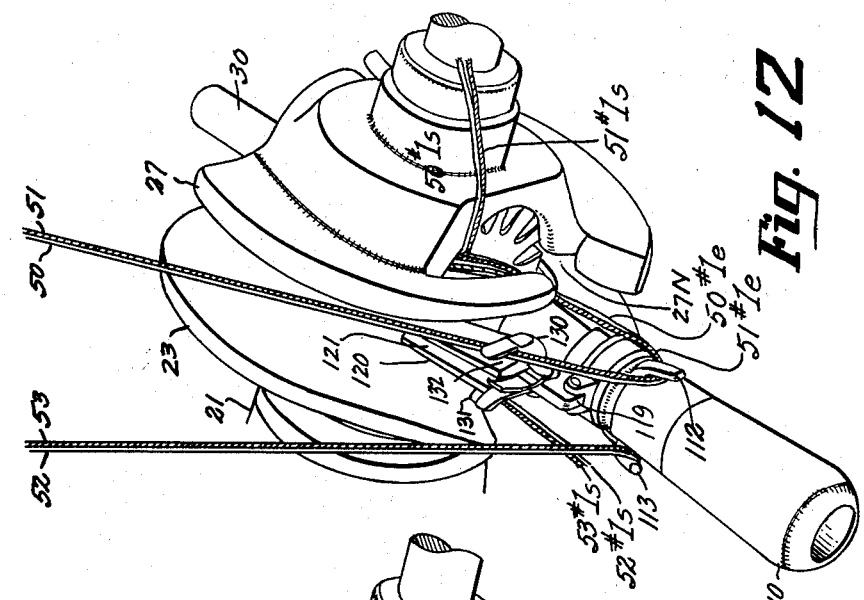
Figure 11:
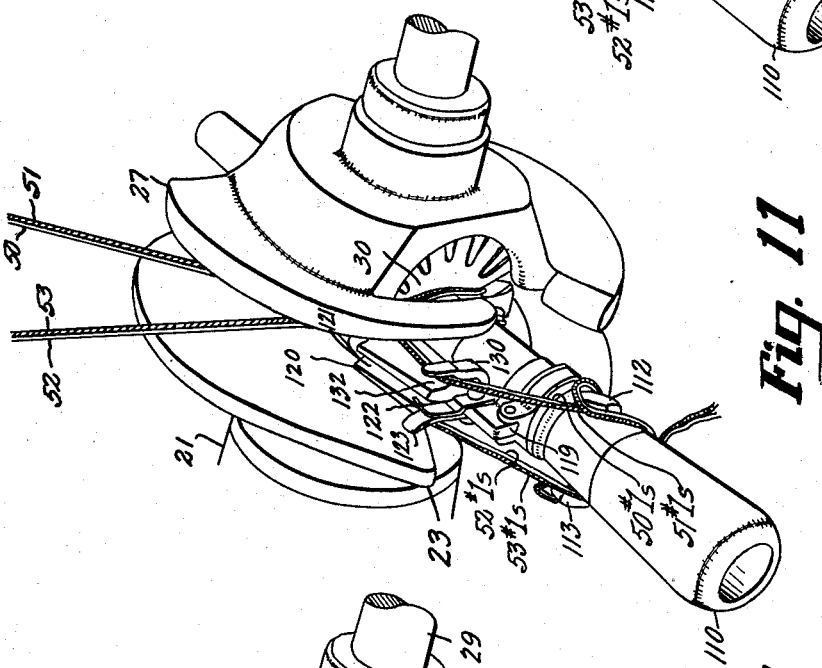
Figure 10:
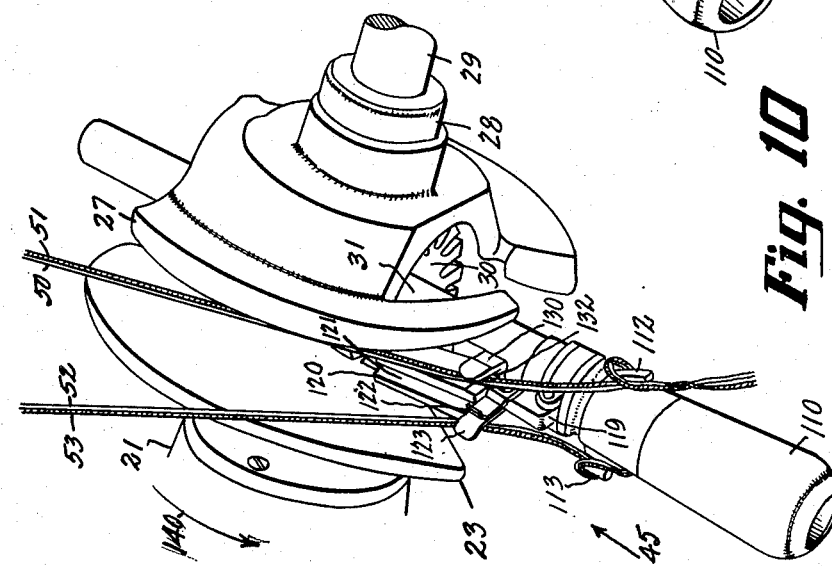
Figure 17:
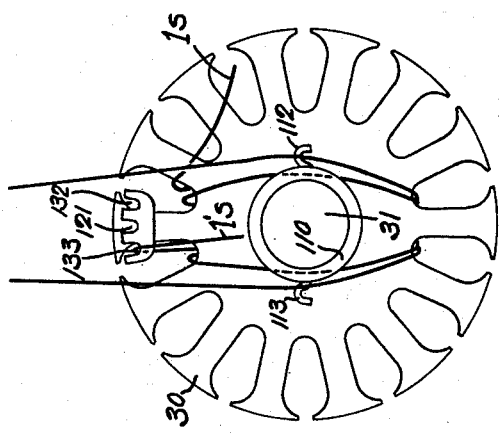
Figure 16:
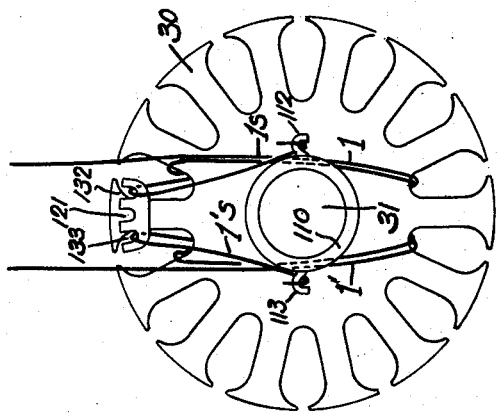
Figure 19:
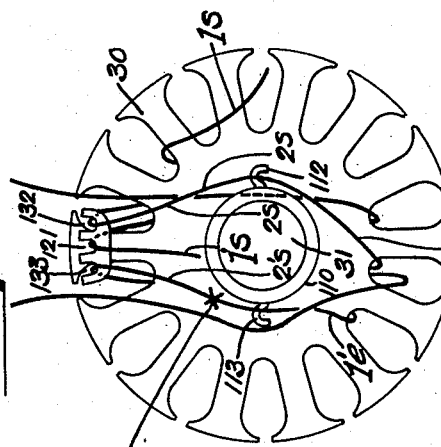

The method of using this tool will now be described with reference to Figs. 10 to 21. To start with, the operator puts an armature core between the winding heads 23 and 27 and mounts the tool handle 110 upon the commutator receiving end of the shaft 31. The wires 50 and 51 which are to be wound together into a pair of spaced slots of the right hand portion of the armature core are attached to the hook 112 and are placed within the notch 132 of block 130 as shown in Fig. 10. Similarly the wires 52 and 53 which are to be wound together in a pair of spaced slots of the left hand portion of the armature core as viewed in Fig. 4 are attached to the hooks 113 and are placed within the notch 133 of block 131. The winding heads are rotated manually in the direction of the arrow 140 in order to wind on the first turns of the windings before the power is applied to the winding heads. Fig. 11 shows the first turn of winding upon the armature core. Following this operation, the power is applied to the winding heads to cause them to rotate in the same direction, namely in the direction of arrow 140 in order to complete the winding of the first pairs of armature coils. Following this operation the free ends or start leads of the coils are unfastened or severed from the hooks 112 and 113 and are moved away from the region of winding of the second coil. In order to understand the manipulation of the wires the start lead of the first coil wound from wire 50 is numbered 50#1s. 50 denotes the wire, #1 denotes that it is the first coil and s denotes that it is the start lead. The other start leads are similarly numbered 51#1s, 52#1s and 53#1s. Following the winding of the first coil these start leads are unfastened or severed from the hooks which previously held them. The start leads 50#1s and 51#1s are removed from the notch 132 of block 130 and are bent toward the right out through notch 27N of the winding head 27 as shown in Fig. 12. It will be understood that the locating of the leads 50#1s and 51#1s in the notch 132 of the block 130 is done for the purpose of holding these start leads in a position such that the active coil sides of the first turns will not be pushed down into the bottom of the slots by subsequent turns but will be located along the side thereof so that the start lead of the coil will appear to emerge from the wire as near to the top of the slot as the end leads which in Fig. 12 are designated by numerals 50#1e and 51#1e, the letter e designating the end lead of these coils. Fig. 16 shows diagrammatically the armature and tool after completion of winding the first coils. In this and the following diagrams armature coil #1, represents windings formed of wires 50 and 51, and coil
#1' represents windings formed of wires 52 and 53. Symbol 1s refers to the start leads of coil #1 or the first coil formed of wires 50 and 51. Symbol #1's refers to the start leads of coil #1' or the first coil of wires 52 and 53. As shown in Fig. 17, start lead 1s, which is equivalent to leads 50#1s and 51#1s of Figs. 11 and 12, has been removed from hook 112 and pulled to the right to clear the region of winding of coil #2 to be wound at the right of the armature core axis. Start lead 1's, which is equivalent to leads 52#1s and 53#1s, has been removed from hook 113 and placed in notch 133 of the tool in order to clear the region of winding of coil #2' to be wound at the left of the armature core axis. Fig. 12 shows start leads 52#1s and 53#1s, which are represented by 1's in Fig. 17, to have been placed in notch 133.

Figure 18:
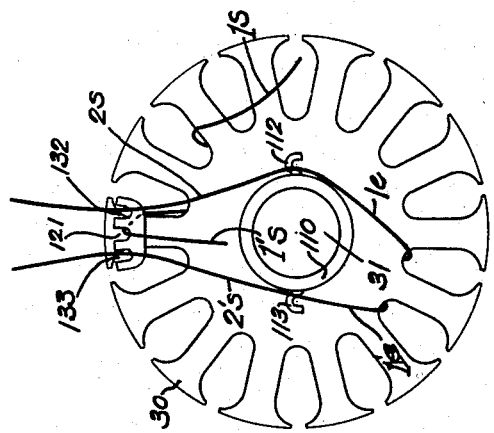
Figure 21:
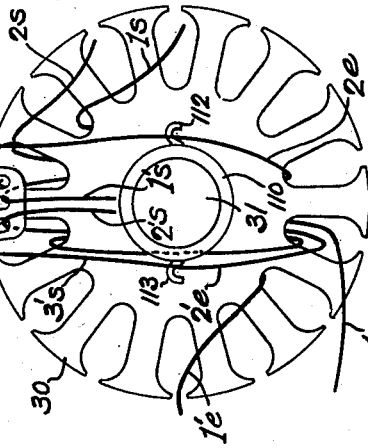
Figure 20:
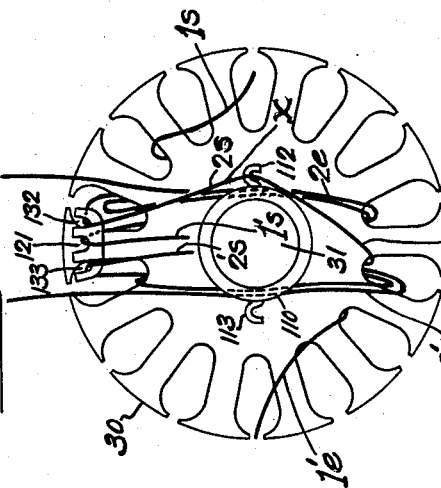

Figs. 12 and 18 show the status of the work preparatory to winding the second sets of armature windings. Following the winding of the first sets of coils the core 30 is indexed into the next winding position by turning the same in a clockwise direction as viewed in Fig. 4, while the head 27 is held separated a slight distance from the head 23. Then the wires 50 and 51 are again looped around the hook 112 and the wires 52 and 53 are looped around the hook 113. The wires 50 and 51 are placed in the recess 132 of the block 130 and the wires 52 and 53 are placed in the recess 133 of the block 131.
As shown diagrammatically in Fig. 18, the right hand wire representing wires 50 and 51 is placed around hook 112 and is placed in notch 132 of the tool; and the left hand wire representing wires 52 and 53 is placed around hook 113 and is placed in notch 133, the end lead #1's having been placed in groove 121 as shown in Fig. 18 or allowed to remain in notch 133 as shown in Fig. 12. That portion of the right hand wire extending from the first right hand coil (representing the first coils of wires 50 and 51) and passing around hook 112 and into notch 132 provides a part #1e and a part #2s. Part #1e represents the end leads 50#1e and 51#1e of the first coils of wires 50 and 51. Part #2s represents the start leads of the second coils to be formed of wires 50 and 51. Similarly that portion of the left hand wire extending from the first left hand coil (representing the first coils of wires 52 and 53) and passing around hook 113 and into notch 133 provides a part #1'e and a part #2's. Part #1'e represents the end leads 52#1e and 53#1e of the first coils of wires 50 and 51. Part #2's represents the start leads of the second coils to be formed of wires 52 and 53.
Before the left hand loop passing around hook 113 is cut to clear end leads represented by #1'e from the winding region of the second left hand coils the winding heads are rotated manually as before in the direction of arrow 140 in order to wind upon the core the first turns of the second pairs of coils. The progress of the winding thus far is shown in Fig. 13 and it will be noted that the loops of wires 50 and 51 which pass around the hook 112 provide the end leads 50#1e and 51#1e of the first coils and the start leads 50#2s and 51#2s of the second coils. The wires 52 and 53 which pass around the hook 113 provide the end leads 52#1e and 53#1e of the first coils on the left hand side and the start leads of the second coils on the left hand side these leads being hidden by the handle 110 in Fig. 13 and indicated respectively by numerals 52#2s and 53#2s in Fig. 15. After winding manually the first turn of the second pairs of coils and before power winding the remaining turns of the pairs of coils the wire loops joining the ends of the first pair of coils on the left hand side with the second pair of coils on the left side are cut near the hook 113 (refer to point W in Fig. 19) in order to sever the end leads 52#1e and 53#1e of the first pair of left hand coils from the start leads 52#2s and 53#2s of the second pair of left hand coils. This permits moving the leads 52#1e and 53#1e toward the left through the notch 23N of the winding head 23 so that these leads will be out of the winding region of the second pair of left hand coils. By so doing the end leads of the first pair of left hand coils will not be buried under those portions of the second pair of left hand coils which overlie the end of the armature core. The location of the end leads 52#1e and 53#1e is shown in Figs. 14 and 15. Fig. 20 shows lead #1'e (representing leads 52#1e and 53#1e) to have been severed from lead #2's and to have been pulled to the left out of the region of winding of the second left hand coils. Lead #2'S (representing leads 52#2's and 53#2's) has been placed in notch 133 and lead #1's has been placed in groove 121. Fig. 15 likewise shows the start leads 52#2s and 53#2s of the second pair of left hand coils in position for completing the winding of the second pair of coils and it will be noted that these leads 52#2s and 53#2s are received in the notch 133 of the block 131. Since the end leads 50#1e and 51#1e (represented by #1e in Fig. 20) of the first pair of right hand coils are out of the winding region of the second pair of right hand coils as shown in Fig. 15, it is not necessary to cut the loops forming these leads 50#1e, 50#2s and 51#1e and 51#2s before completing the winding of the second pairs of coils. After completing by power winding the second pairs of coils the loops of wires connecting the first and second pairs of right hand coils are cut at point X in Figs. 15 and 20 in order that, before winding the third pairs of coils the leads 50#2s and 51#2s can be moved toward the right out through the notch 27N of winding head 27 so that these leads, like leads 50#1s and 51#1s will not be located in the winding region of the third pair of right hand coils. Leads 50#1e and 51#1e are pulled toward the left to clear the winding region of the third right hand coils. In Fig. 21, symbol #1e refers to the lead which diagrammatically represents leads 50#1e and 51#1e, and it will be seen that this lead #1e has been pulled toward the left of the core; and in Fig. 21, symbol #2s refers to the lead which diagrammatically represents leads 50#2s and 51#2s, and it will be seen that this lead #2s has been pulled toward the right of the core. Fig. 21 shows the status of the work preparatory to indexing for the next winding operation. The right hand wires (50 and 51) are again placed around the hook 112 and the left hand wires around the hook 113, and the core is indexed into the next winding position. The winding of the third and subsequent sets of coils continues as stated with respect to the winding of the second sets of coils.

It is apparent that the procedure is as follows:—Before winding the second sets of coils disconnect the start leads of the first sets of coils from the hooks and place these leads out of the winding region. After winding manually the first turns of the second and subsequent coils and before power winding, cut the left hand loops which pass around hook 113 and which form the start leads of the next left hand coils to be completed and the end leads of the left hand coils just completed, and then pull the said end leads to the left out of the winding region and place the said start leads of the coils next to be completed in a notch or groove of the tool, which notch or groove is located to the right of the winding region of the left hand coils. After completing the power winding of the second and subsequent coils cut the right hand loops which pass around the hook 112 and which form the end leads of the previously wound right hand coils and the start leads of the right hand coils just completed, and then pull said end leads of the right hand coils previously wound toward the left, and pull the said start leads of the right hand coils just completed toward the right. Then index to the next winding position. Before or after indexing, place the right and left hand wires (which lead from the supply reels) around the hooks 112 and 113 respectively and in notches 132 and 133 respectively.

Whenever any of the lead loops are clipped they are clipped at a point between a hook and a recess block for example between the hook 112 and the recess block 130. This manner of cutting provides leads of two different lengths to distinguish the end leads which are longer from the start leads which are shorter. In this way the various leads can be distanced for the purpose with the connection of armature segments.

Following the winding of any sets of coils, their start leads which had previously been held by the recess blocks 130 and 131 are removed from these recess blocks and are located so that the start leads will lie in the armature core slots upon the other windings of that coil. In this way all of the start leads as well as the end leads emerge from the core slots as near as possible to the periphery of the core and none of these leads are buried down deeply by the portions of windings which overlap the end of the core. Referring to Figs. 16 to 21, the start leads of the right hand coils remain in notch 132 until after those coils are wound; and the start leads of the left hand coils remain in notch 133 until after those coils are wound. The start leads of the right hand coils are kept out of the winding region by pulling them toward the right of the core. The start leads of the left hand coils are kept out of the winding region by placing them in groove 121 until the core has been indexed to such an extent that some of the start leads of the left hand coils may also be pulled toward the right of the core.

Figure 6:
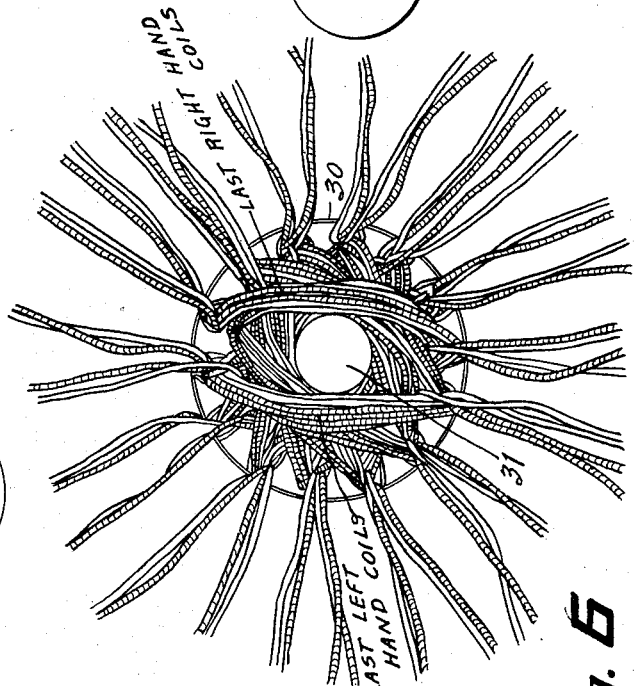
Fig. 6 is a view looking at the commutator end of an armature wound by the present machine.

The winding continues until each slot receives the active coil sides of at least two sets of coils. Fig. 6 shows an end view of the complete armature and it will be noted that the leads emerge as near as possible to the periphery of the core.

It is apparent from the foregoing description of the apparatus and the manner of using the same that the cost of winding armatures has been reduced since a plurality of sets of coils are wound simultaneously. A further advantage is that the armature is more nearly in running balance since the amount of material employed in winding any set of armature coils is substantially the same as that employed in winding the other set which was wound at the same time, and since the material of both sets is symmetrically arranged with respect to the armature axis.

While the form of embodiment of the present invention as herein disclosed, constitutes a preferred form, it is to be understood that other forms might be adopted, all coming within the scope of the claims which follow.

What is claimed is as follows:

1. Armature winding apparatus comprising, in combination, means for rotatably supporting an armature core upon an axis at right angles to the core axis, means for guiding a plurality of sets of wires simultaneously into a plurality of pairs of spaced slots, respectively, of the armature core, means for forming wire loops between successively wound armature coils, said loops providing the end leads of previously wound coils and the start leads of succeeding coils, and means for maintaining the starting leads within the slots but away from the bottoms thereof while the other turns of the started coils are being wound.

2. Armature winding apparatus comprising, in combination, means for rotatably supporting an armature core upon an axis at right angles to the core axis, means for guiding a plurality of sets of wires simultaneously into a plurality of pairs of spaced slots, respectively, of the armature core, a tool comprising a hollow handle adapted to be mounted upon a portion of the armature shaft extending from the core and having hooks around which are looped the wires which join successively wound armature coils, said loops providing the end leads of previously wound coils and the start leads of succeeding coils, and notched members carried by said tool for maintaining the starting leads within the slots but away from the bottoms thereof while the other turns of the started coils are being wound.

3. Armature winding apparatus comprising, in combination, means for rotatably supporting an armature core upon an axis at right angles to the core axis, means for guiding a plurality of sets of wires simultaneously into a plurality of pairs of spaced slots, respectively, of the armature core, means for forming wire loops between successively wound armature coils, said loops providing the end leads of previously wound coils and the start leads of succeeding coils, means for maintaining the starting leads away from the bottom of the slots while the other turns of the coils are being wound; a grooved member for receiving leads of previously wound coils, and a pair of spring clips for retaining said leads in said grooves to keep the leads away from the winding region of succeeding coils.

4. Armature winding apparatus comprising, in combination, means for rotatably supporting an armature core upon an axis at right angles to the core axis, means for guiding a plurality of sets of wires simultaneously into a plurality of pairs of spaced slots, respectively, of the armature core, means for forming wire loops between successively wound armature coils, said loops providing the end leads of previously wound coils and the start leads of succeeding coils, a grooved member for receiving leads of previously wound coils, and a pair of spring clips for retaining said leads in said groove to keep the leads away from the winding region of succeeding coils.

5. Armature winding apparatus comprising, in combination, means for rotatably supporting an armature core upon an axis at right angles to the core axis, means for guiding a plurality of sets of wires simultaneously into a plurality of pairs of spaced slots, respectively, of the armature core, means for forming wire loops between successively wound armature coils, said loops providing the ends of previously wound coils and the start leads of succeeding coils; and a tool comprising a hollow handle adapted to be mounted upon a portion of the armature shaft extending from the core and having notched members for maintaining the starting leads within the slots but away from the bottoms thereof while other turns of the started coils are being wound.

6. Armature winding apparatus comprising, in combination, means for rotatably supporting an armature core upon an axis at right angles to the core axis, means for guiding a plurality of sets of wires simultaneously into a plurality of pairs of spaced slots, respectively, of the armature core, means for forming wire loops between successively wound armature coils, said loops providing the end leads of previously wound coils and the start leads of succeeding coils; means for maintaining the starting leads within the slots but away from the bottoms thereof while the other turns of the started coils are being wound; and means for receiving the severed leads of previously wound coils and for maintaining the same out of the winding region.

7. A tool adapted to be used in winding a plurality of sets of armature coils simultaneously into a plurality of sets of spaced slots, respectively, of an armature core, said tool comprising a hollow handle adapted to be mounted upon a portion of the armature shaft extending from the core and having hooks around which are looped wires which join successively wound coils, said leads providing the end leads of previously wound coils and the start leads of succeeding coils, notched members carried by the handle for maintaining the start leads away from the bottoms of the slots while the other turns of the coils are being wound, and a grooved member located between said notched members and adapted to receive leads of previously wound coils.

8. Armature winding apparatus comprising, in combination, means for rotatably supporting an armature core upon an axis at right angles to the core axis, means for guiding wire into certain spaced slots of the core, and means for supporting the starting lead at such distance from the end of the core and at such distance from the core axis that the starting lead will be held within a slot but away from the bottom thereof and held away from the winding region, while permitting the winding into that slot of that active coil side to which the starting lead is directly connected.

9. Armature winding apparatus comprising, in combination, means for rotatably supporting an armature core upon an axis at right angles to the core axis, means for guiding wire into certain spaced slots of the core, means for forming a wire loop between successive coils to provide an end lead for a previously wound coil and a starting lead for a succeeding coil, and means for supporting the starting lead at such distance from the end of the core and at such distance from the core axis that the starting lead will be held within a slot but away from the bottom thereof and held away from the winding region, while permitting the winding into that slot of that active coil side to which the starting lead is directly connected.

LEO C. SHIPPY.
LEWIS G. MALONE.